US008880560B2

(12) United States Patent
Hadar et al.

(10) Patent No.: US 8,880,560 B2
(45) Date of Patent: Nov. 4, 2014

(54) AGILE RE-ENGINEERING OF INFORMATION SYSTEMS

(75) Inventors: Eitan Hadar, Nesher (IL); Kieron John James Connelly, Brighton (GB); Olga Lagunova, Butler, PA (US); Mitchell Edward Engel, Setauket, NY (US); Peter Anthony Lazzaro, Great River, NY (US)

(73) Assignee: CA, Inc., Islandia, NY (US)

( * ) Notice: Subject to any disclaimer, the term of this patent is extended or adjusted under 35 U.S.C. 154(b) by 733 days.

(21) Appl. No.: 12/768,915

(22) Filed: Apr. 28, 2010

(65) Prior Publication Data
US 2011/0270804 A1 Nov. 3, 2011

(51) Int. Cl.
G06F 17/30 (2006.01)
G06F 7/00 (2006.01)
G06F 9/44 (2006.01)

(52) U.S. Cl.
CPC ... *G06F 8/36* (2013.01); *G06F 8/35* (2013.01)
USPC ............ 707/802; 707/684; 717/104; 718/100

(58) Field of Classification Search
CPC .................................. G06F 8/35; G06F 8/36
USPC .................... 707/802, 684; 717/104; 718/100
See application file for complete search history.

(56) References Cited

U.S. PATENT DOCUMENTS 6,574,605 B1 * 6/2003 Sanders et al. ............... 705/7.26
7,065,624 B1 * 6/2006 Zahavi ......................... 711/170
2003/0005112 A1 * 1/2003 Krautkremer ................. 709/224
2006/0053422 A1 * 3/2006 Alikacem et al. ............. 718/100
2006/0161884 A1 * 7/2006 Lubrecht et al. .............. 717/104
2006/0225032 A1 * 10/2006 Klerk et al. ................... 717/105
2009/0193064 A1 * 7/2009 Chen et al. .................... 707/204
2010/0145755 A1 * 6/2010 Narkilahti ........................ 705/8
2011/0213738 A1 * 9/2011 Sen et al. ........................ 706/12
2011/0265064 A1 * 10/2011 Hadar et al. .................. 717/121

OTHER PUBLICATIONS

"A Survey of Software Refactoring", IEEE Transactions on Software Engineering, vol. 30, No. 2, (Feb 2004), 126-139.
"CA CMDB", [Online]. [Archived Aug. 22, 2008]. Retrieved from the Internet: <URL: http://web.archive.org/web/20080822101049/http://ca.com/us/cmdb.aspx>, 1 pg.
"CA Service Desk", [Online]. [Archived Aug. 22, 2008]. Retrieved from the Internet: <URL: http://web.archive.org/web/20080822101524/http://ca.com/us/service-desk.aspx>, 1 pg.
"Change and Configuration Management", [Online]. Archived [Aug. 22, 2008] Retrieved from the Internet: <URL: http://web.archive.org/web/20080822110500/http://ca.com/us/configuration-management.aspx>, 2 pgs.

(Continued)

Primary Examiner — Shew-Fen Lin
(74) Attorney, Agent, or Firm — Schwegman Lundberg & Woessner, P.A.

(57) ABSTRACT

Various embodiments described and illustrated herein include at least one of systems, methods, and software to identify and resolve violations of system and process performance measuring metrics. Following identification of such a violation, some embodiments may identify and cause a solution to be implemented. Following implementation of a solution, the violated metrics are again applied and the results evaluated to verify resolution of the metric violation. Some embodiments may repeat this process until the metric violation or violations are resolved.

16 Claims, 10 Drawing Sheets

(56) References Cited

OTHER PUBLICATIONS

"Data Center Automation Capability Solutions", [Online]. Retrieved from the Internet: <URL: http://www.ca.com/us/products/collateral.aspx?cid=187605>, (Oct. 6, 2008), 3 pgs.

"Enterprise IT Management (EITM)", [Online]. [Archived Aug. 22, 2008]. Retrieved from the Internet: <URL: http://web.archive.org/web/20080822043834/http://www.ca.com/us/enterprise-it-management.aspx>, 3 pgs.

"Solution Brief: Service Availability Management", [Online]. Retrieved from the Internet: <URL: http://www.ca.com/files/SolutionBriefs/sam_solution_brief.pdf>, (2008), 16 pgs.

"Welcome to the Official ITIL Website", [Online]. [Archived Aug. 22, 2008]. Retrieved from the Internet: <URL: http://web.archive.org/web/20080822022232/http://www.itil-officialsite.com/home/home.asp>, 2 pgs.

Chikofsky, E J, et al., "Reverse Engineering and Design Recovery: A Taxonomy", IEEE Software, vol. 7, No. 1, (1990), 13-17.

\* cited by examiner

── 402

| DATABASE SERVER DB3-#23 ||
|---|---|
| NAME | ERP-BW-1 |
| DESCRIPTION | MAIN DB FOR ERP BW IN EMEA |
| # OF LICENSES | 4 |
| COST/LICENSE | 18000.00 |
| MAINT COSTS | 1200.00 |

| DATABASE SERVER ||
|---|---|
| NAME | STRING |
| DESCRIPTION | STRING |
| # OF LICENSES | NUMBER |
| COST/LICENSE | MONEY |
| MAINT COSTS | MONEY |

*FIG. 5*

AGILE RE-ENGINEERING OF INFORMATION SYSTEMS

BACKGROUND INFORMATION

Stakeholders in the domain of enterprise information technology management are required to maintain and often improve qualitative operating levels of organizational information services and system. However, improving operating levels in view of change management procedures is a large undertaking as such change procedures often grow with the size of the enterprise. Emphasis is placed on quality control prior to implementation and multiple levels of approval are often needed. As a result, maintaining and improving quality becomes a very time consuming and strategic task. As a result, enterprise information technology management becomes less agile as systems and enterprise bureaucracy increases.

SUMMARY

Various embodiments described and illustrated herein include at least one of systems, methods, and software to identify and resolve violations of system and process performance measuring metrics. Following identification of such a violation, some embodiments may identify and cause a solution to be implemented. Following implementation of a solution, the violated metrics are again applied and the results evaluated to verify resolution of the metric violation. Some embodiments may repeat this process until the metric violation or violations are resolved.

Some embodiments may include evaluating results of service model metrics applied to elements of a computing environment to identify a service model for performance improvement. The service model metric results and data representative of the service are typically stored in a database accessible via a network. Such embodiments further include querying a pattern repository to identify a pattern, the implementation of which is likely to improve performance of the identified service model. The pattern repository may also be accessible via the network. A command may then be sent to a provisioning application to implement the identified pattern. The service model metrics are then reapplied to the computing environment to obtain current metric results. The current metric results may then be compared with stored service model metric results to verify that performance of the service model has improved.

Another embodiment includes identifying a performance indicator violation within a dataset of performance metric data and retrieving, from a pattern database, a pattern including a group of configuration item settings which when implemented, are likely to resolve the performance metric violation. Such embodiments further includes issuing at least one command to implement the group of configuration item settings of the retrieved pattern and applying at least one performance metric to confirm the performance indicator violation has been resolved.

BRIEF DESCRIPTION OF THE DRAWINGS

FIG. 4 illustrates a data structure according to an example embodiment.
FIG. 5 illustrates a data structure according to an example embodiment.

DETAILED DESCRIPTION

In enterprise information technology (IT) management, managers and administrators are tasked with maintaining qualitative operating levels of the information system (IS) and IT services. Such tasks may be achieved by aligning production IT infrastructure to the business IS needs and by measuring service quality levels using metrics, such s Key Performance Indicators (KPI). Some embodiments may also include identification of implemented system and system configuration structures that may be a root cause of a current performance issue or may create a performance or other issue in the future.

Many quality attributes of IS services relate to deployment and run-time characteristics of the provided service. The deployed services are required to maintain their functionality while adapting to environmental factors, such as network fluctuations, changeable load, and server, device, and environmental malfunctions.

In structural terms, a deployed service is comprised of several underlying services or Configuration Items (CIs), occupying multiple management domains and therefore instrumented by different management technologies, each contributing a partial set of the capabilities and relative quality attributes to the provided service.

Figure 1:
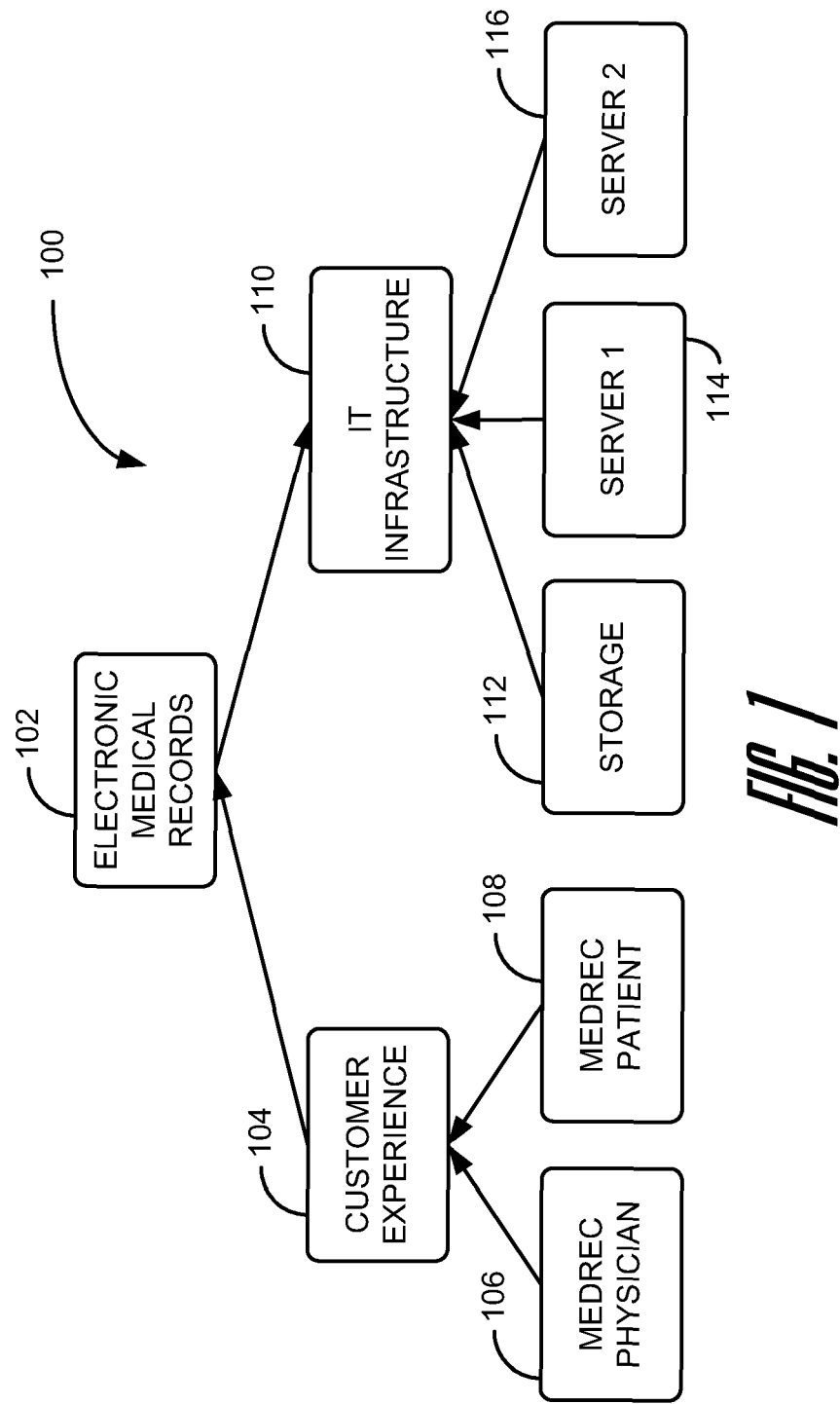
FIG. 1 illustrates a service model of a service according to an example embodiment.

A service is comprised of the contributing CIs and bi-directional relationships between them. Moreover, the supporting CIs may be part of several services, providing many-to-many associations in constructing a topological tree. For example, FIG. 1 illustrates a service model 100 of an electronic medical records service 102. The electronic medical records service 102 includes an underlying IT infrastructure CI group 110 of services as well as another logical group 104 of two services: medical records physician service 106 and medical records patient service 108. The IT infrastructure CI group 110 is comprised of a storage system 112 and two servers 114, 116, while the medical records physician service 106 and medical records patient service 108 aggregate measures of end-user experience with the electronic medical records service 102 from the perspective of physicians and patients.

Service quality improvement includes visibility into service-measured attributes, accumulated and presented over time. Furthermore, the relevant risk associated with a service may be utilized for understanding potential future degradation in the service quality. Thus, ensuring quality attributes of IS services includes run-time measurement and monitoring of the quality and risk attribute metrics. As an example, consider the case where a CI is a logical IT service, such as credit card Validation, comprised of a business process that uses mail servers, a web server and database servers for fulfilling the process. The overall performance metric of the credit card IT Service is the accumulative sum of the separate transactions on each server. The overall malfunctioning (risk) metric is the number of reported requests for repair (service request). The operational needs of IT managers and administrators involves reduction of the number of malfunctions and an increase in the IT service performance, according to a preset threshold. Thus, the metrics implemented will measure the number of aggregated support calls from these CIs, as well as aggregated performance duration for each service call, combined with associated thresholds.

In order to maintain quality levels, namely, "keeping the lights on" for the IS services, or in cases where capacity improvements and load adjustments is of need, various embodiments herein address at least two particular issues. First, understanding overall quality of a service from multiple perspectives. Second, modifying service and infrastructure configuration and obtaining rapid success feedback to ensure configuration modifications achieved the desired quality improvement.

Various embodiments herein include a refactoring procedure aimed at improving design and configuration in existing systems. The basic concept of the procedure is to preserve the behavior of the system while manipulating its structure and configuration to improve its quality according to specific measures, such as metrics and KPIs. Re-engineering services in the domain of IS and IT, implies maintaining their quality attributes and is based on an understanding of system status in near real-time.

Some embodiments include a service availability manager (SAM) tool that enables definition and refactoring of IT services by unifying the management of the elements that comprise the service (the supporting CIs). These CIs may span all management domains and layers of the IT infrastructure through aggregation into a single, unified service model, such as is illustrated in FIG. 1, to understand service quality and risk of services deployed to the IT infrastructure.

Modeling of the services is aimed at aggregating the combined IT infrastructure and composite IS services with performance monitoring. When an alarm (event that notifies a critical metric reached its pre-defined threshold or that another certain condition is present) is received, it is analyzed according to the modeled services and relative effects on the overall metrics (shown in FIG. 2). This model-based impact analysis distinguishes between problems indicating degradation of service quality and problems that increase the risk of service delivery.

Figure 2:
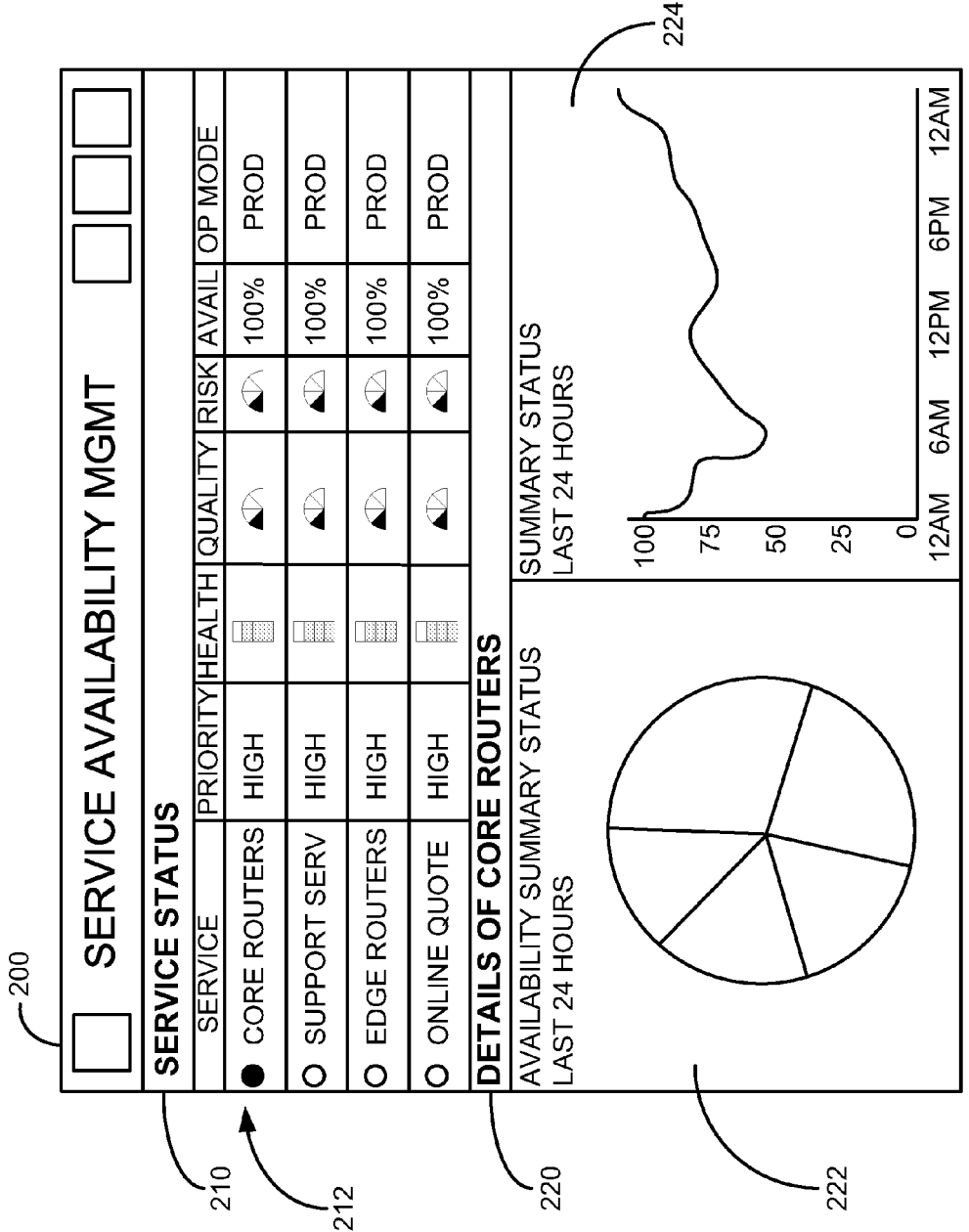
FIG. 2 is a user interface illustration according to an example embodiment.

Although there may be many metrics, these metrics may be aggregated into a larger metric that measures multiple aspects or dimensions of system, service, and infrastructure performance. Some embodiments include major metrics such as Priority, Health, Quality, Risk, and Availability, as illustrated in FIG. 2. Calculation of these metric attributes may be as follows:

Priority: This is assigned by the owner of the service model according to the relative importance of the service to the business or other services. Understanding how critical a service is to the business will help to determine the prioritization of alarms that affect that service.

Quality: A measure of the end-user or (IT) consumer experience in using a service. Examples of quality metrics include the transaction time associated with completing a key user task such as logging on to the system, or the number of service desk incidents (calls) raised against the service relative to the usual baseline (normal system operation). In order to prescribe meaning to a given metric, it is typically associated with a threshold. For example, if the number of active incidents associated with a service exceeds 100, the service is considered to be delivering degraded quality.

Risk: A measure of the extent to which the problems currently associated with the IT infrastructure impact the overall likelihood that required service quality levels can be delivered. In essence, as service and infrastructure elements encounter problems, risk that service quality will degrade increases. Due to typical IT risk-mitigation measures such as redundancy, fault tolerance, and high availability, faults in the IT infrastructure may not directly result in degradation in service quality, but they will result in an increased risk to delivering that quality over time. For example, in a server farm consisting of 10 servers supporting an online application, if 25% of the servers are unavailable the service may be considered at risk of being moderately degraded. If 50% are unavailable, the service may be considered at risk of being severely degraded. Naturally, if 100% are unavailable, the risk of a service outage is extremely high.

Health: Health is a reflection of the worst state currently held by either Quality or Risk, and gives a high-level summary of the service health according to those metrics. For example, if service quality is currently normal, but the service is at risk of severe degradation, health will reflect a severely degraded status.

Availability: Availability is an abstracted, time-series measure of service uptime and downtime based on the health of the service. For example, a severely degraded service may be considered in all practical purposes unavailable, even though it is partially active, and if it held that status (or worse) for 12 of the last 24 hours, availability would show as 50% for that period.

Quality and Risk typically have a reciprocal relationship, working on the assumption that as the risk to delivering service quality increases, the service quality itself will begin to decrease.

In some embodiments, for each of the managed and modelled services, the SAM tool provides a series of reports providing a historical perspective on factors relevant to sustaining service quality or reducing risk. For example, reports include the top ten problematic services and their relative status, availability for the last 24 hours, quality or risk for the last month, and others. As such, the SAM tool can perform trend analysis across these metrics, and identify deviations in trends through comparisons across reports. An example of such reports, when presented to an administrator, is illustrated in FIG. 2 where the availability summary status for the last 24 hours is provided in two perspectives 222, 224. However, these reports and the trend analysis may be performed automatically and the results used automatically to identify services and infrastructure in need of refactoring and restructuring to improve system, service, or infrastructure performance as measured by a particular metric or as contributing to overall system Priority, Health, Quality, Risk, and Availability.

Refactoring and restructuring in the context of re-engineering provides examination and alteration of a subject system and reconstitutes it in a new form with subsequent implementation. Moreover, in agile approaches, prioritizing work tasks can be crucial to the concept of iterative development, including change management and crisis situations.

Agile development life cycle approaches focus on a reduced set of deliverables (design, implementation, test, deploy) associated with a larger task by using incremental system, service, and infrastructure advancement, with correcting iterations if needed. Validation and verification of the modification is performed following implementation to provide a near real-time understanding of the changes applied. If an implementation does not achieve what was intended, the change may be rolled back. Further, an implementation may be intended to be only an incremental solution. Following confirmation that the implementation provided the intended incremental improvement, through application of one or more metrics and a comparing of the metric results to a previous metric result, a next incremental implementation may be made and verified.

Through such embodiments, the SAM tool supports agility within the context of IS re-engineering. Specifically, for the design and testing phases, as well as continuous verification that might identify a need to modify existing structures through automated or manual configuration changes.

Automated and manual configuration changes, in some embodiments, may be performed through use of patterns. Patterns refer to recommendations for designing and implementing well-known solutions to well-defined problems. Patterns are prototypical micro-architecture solutions that enable copying of patterns and adaptation of particular design structures to solve recurrent problems described by the copied patterns. Patterns are therefore sophisticated tips and tricks indicating that a certain solution was implemented successfully over a set of solutions and constructed approximately the same way.

Patterns are also used in some embodiments to identify the potential presence of performance issues, either currently presented or likely to be presented in the future by a system or service configuration. These patterns are referred to as anti-patterns. Anti-patterns are a form of a pattern, but rather than being a possible solution to a problem, anti-Patterns are symptoms, or other system properties, that indicate a bad solution was implemented for a known problem. Anti-patterns may be represented and stored in a pattern data structure just as patterns described above. An anti-pattern similarly includes data representative of CI configuration settings defining an anti-pattern. The data representative of the CI configuration settings defining an anti-pattern is searched for within a target computing system or service to detect anti-pattern presence. To facilitate resolution of identified anti-patterns, the pattern data structure of an anti-pattern may include additional data such as metadata that identifies one or more patterns that can be implemented to resolve the anti-pattern.

Information Technology (IT) design often involves combinations of CIs, as well as other supporting processes that collectively, based on modeled associations, construct a logical group of CIs, known as a service model, as discussed above. The CIs may represent elements of IT infrastructure technology such as routers, switches, data storage devices, servers, client computers, logical server programs and processes, and applications and processes that execute on server or client computers. Service models may be associated with the metrics or anti-patterns. The associated metrics that evaluate parameters of the service model to obtain indicators of quality, availability, risk, and heath levels of an underlying system, and what constituent CIs are influencing the service model. These metrics and indicators can be defined with Service Level Agreements or Objectives (SLA or SLO) and their associated operational level agreements.

A pattern, in some embodiments, is a set of CIs of a service model associated with maintained or improved service levels as measured by at least one SLA or other metric. A pattern may have been identified and generated in the system being monitored or received from another source. Patterns are typically stored in pattern data structures in a pattern repository. A pattern data structure includes data representative of CI configuration settings defining a pattern or anti-pattern. The data representative of the CI configuration settings defining a pattern can be instantiated in the system being monitored to implement the pattern. To facilitate searching and identification of patterns of interest to resolve an identified issue, such as through a metric violation, the pattern data structure may include additional data such as metadata that facilitates searching, provides data to present a visualization of the pattern or anti-pattern, provides a description of the purposes of the pattern, identifies affected configuration items, processes, and services, and other data depending on the particular embodiment.

Upon identification of a metric violation, such as an indication of poor system or service health through application of the metrics, or the presence of an anti-pattern, the process that identified the metric violation or anti-pattern may perform a search of the pattern repository to identify a pattern that is likely to resolve the issue, in whole or in part. The process may then issue a command to a provisioning application to implement the identified pattern. After implementation of the pattern, the metrics may be applied once again to verify that implementation of the pattern resolved the issue and to identify any further issues. The process may repeat until either no further patterns are identified for implementation or until the health of the system or service has reach a desired point of health. These and other embodiments are described with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 2 is a user interface 200 illustration according to an example embodiment. The user interface 200 is an example user interface included in some embodiments to provide visualization options to a system administrator for monitoring system performance over time. The example user interface 200 provides a view of a current service status 210 with regard to several services. When one of these listed services is selected, such as the CORE ROUTERS service 212, details 220 of the CORE ROUTERS service 212 are displayed within the user interface 200.

The service status 210 portion of the user interface 200 includes rows of data with each row representing various aspects of the health of a service operating within a system or computing environment. Note that a service is used herein to refer to a software service, a device, or group of two or more software services and devices. Each listed service in the service status portion 210 includes data identifying the service, the priority of the respective service to overall system health, and a representation of the overall health of the service. The data represented for each service is typically retrieved from a performance metric repository, such as a database, and presented in the user interface 200. The overall health of the service is typically an aggregation of performance metric values that measure various aspects of the health of the service, such as a quality of service provided, a level of risk of the service in breaching an SLA or other requirement, and an availability of the service. When a particular service is selected from the listing of services, such as the CORE ROUTERS service 212, the details of the selected service are retrieved from the performance metric repository.

The details of the selected service, such as the details 220 of the CORE ROUTERS service 212, that are presented include an availability summary status 222 over a period, such as 24 hours. Each of various availability statuses may be displayed in a pie chart or other representation capable of conveying a summary of the availability data. Some embodiments include a control for a user to select a period over which the summary is to be provided, such as the last 24 hours, the previous week or month, or other period. Some embodiments may include another summary view 224 of the same data as the availability summary status 222, but in a different form, such as a timeline. However, differing summary data with regard to the selected service may alternatively be provided.

The user interface 200 provides an example view of performance metric data that may be utilized for several purposes. One such purpose is to identify a service in need of reengineering. A service can be designated as in need of reengineering, when identified by an administrator in some embodiments, through selection of a menu item. In other embodiments, a service may be automatically designated as in need of reengineering by an automated process based on an evaluation of metric data.

In some embodiments, where the need for reengineering is detected by an automated process, the automated process may also identify a reengineering solution to implement and cause the reengineering solution to be implemented.

Figure 3:
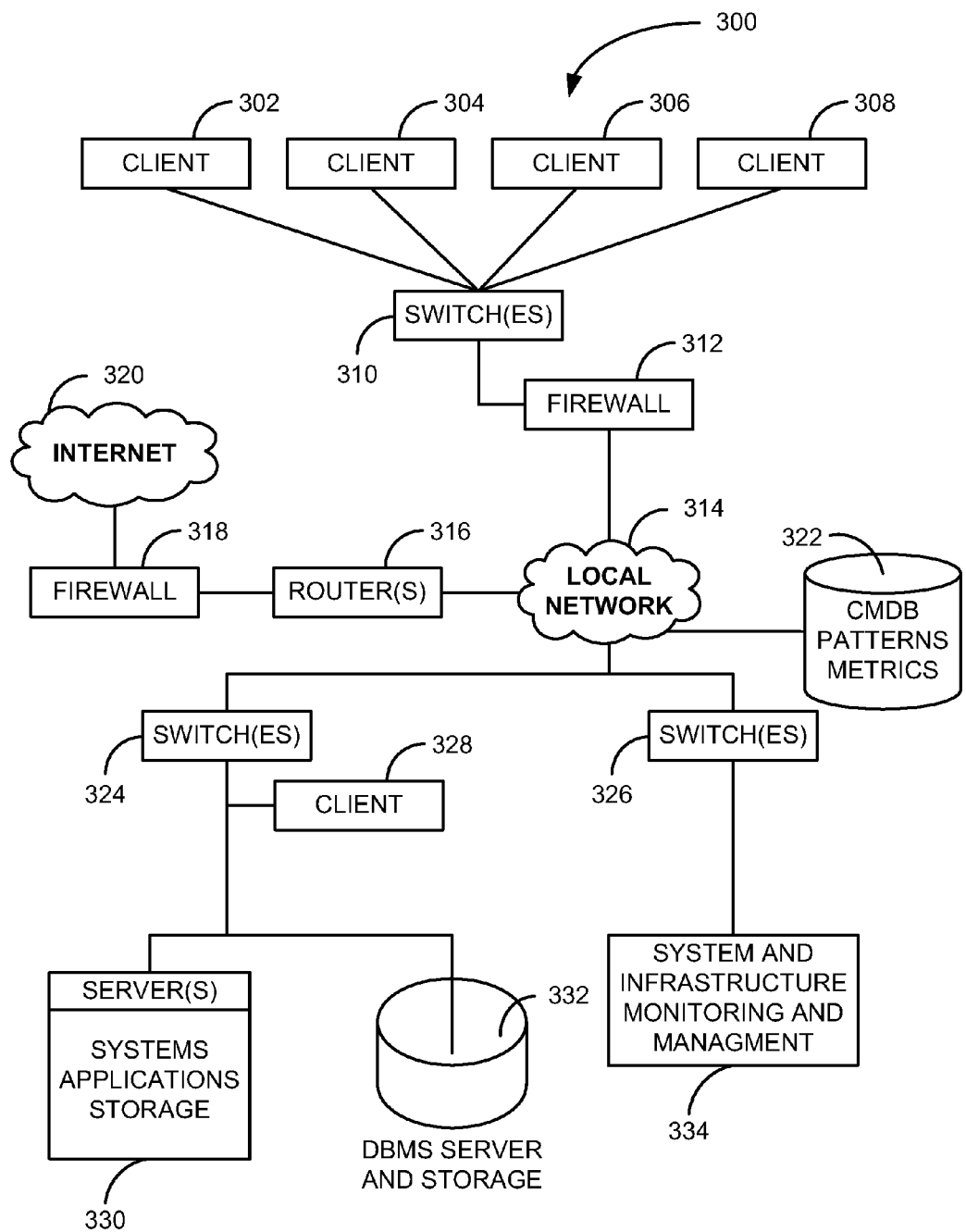
FIG. 3 is a schematic diagram of a system according to an example embodiment.

FIG. 3 is a schematic diagram of a system 300 according to an example embodiment. The system 300 is an example of a system within which metric violations and anti-patterns may be identified and patterns identified and implemented to help resolve the metric violations or anti-pattern presence. The system 300 is provided merely as an example of a system in which some embodiments may be relevant. Although the system 300 is illustrated to include various IT resources, there is no requirement that all or any of these particular IT resources be present in any embodiment. Further, even if present in a particular embodiment, the CIs of these IT resources may not be relevant with regard to metric violation detection, anti-pattern detection, and pattern identification and implementation.

The system 300 is a networked computing environment. The network of the computing environment may include a connection to the Internet 320. In such embodiments, the remainder of the network environment is behind a firewall 318 to help shield the network environment from threats. In a typical configuration, one or more routers 316 then route traffic to a local network 314. A portion of the local network 314 may be shielded from access by some users or processes by another firewall 312. In this illustrated embodiment, the firewall 312 shields clients 302, 304, 306, 308 connected to the networked computing environment via one or more switches 310 from certain types of communications or data over the local network 314.

The local network 314 may also include connections to other IT resources, such as switches 324, 326 that provide additional connections to the local network 314. The additional connections may be utilized by additional clients 328, servers 330 such as one or more application servers hosting an enterprise application, database and storage servers 332, and a system and infrastructure monitoring and management server 334. The additional connections may also be utilized by a database 322 storing a configuration management database (CMDB), data representative of patterns, performance metrics, historic performance metric data, and other IT resources.

In some embodiments, the hardware devices and processes within the computing environment, such as the firewalls 318, 312, routers 316, switches 310, 324, 326, servers 330 databases 322, 332, and other devices and processes, include an agent process that may be leverage by the system and infrastructure monitoring and management server 334. The agent processes of the hardware devices and processes may be Simple Network Management Protocol (SNMP) agent processes through which performance may be measured and configurations may be modified. In other embodiments, the agent processes of the hardware devices and processes may be proprietary agent processes, modified SNMP agent processes, or agent processes according to a different network management protocol. Yet other embodiments include two or more of such agent processes.

In some embodiments, the system and infrastructure monitoring and management server 334 performs several tasks through various processes. Such tasks may include application of performance-monitoring metrics within the networked computing environment 300 and archiving of performance metric data, presenting analytic views of performance metric data such as through the user interface 200 of FIG. 2, and providing administrator tools to modify CI settings of the various IT resources of the networked computing environment 300. Such tasks may also include archiving historic CI settings, pattern and anti-pattern identification through evaluation of archived performance metric data of service models and archived CI settings of respective service models, and pattern selection and implementation to resolve performance metric violations and anti-pattern presence.

In some embodiments, the system and infrastructure monitoring and management server 334 applies performance-monitoring metrics within the networked computing environment 300. Performance-monitoring metrics, or simply metrics, measure various aspects of performance of devices and processes within the networked computing environment 300. One or more metrics may be associated with a service model and an aggregation of metric result data of the one or more metrics associated with a particular service model provides a performance measurement of the particular service model. A performance metric may be defined by an administrator to measure response time of hardware networking devices, latency in process response, availability of a device or process, available storage capacity of a data storage device, and other performance characteristics of devices and processes. A service model may include one or more aggregations of metric data to provide an overall measurement of service model health, quality, risk, availability, or other indicator depending on the embodiment.

In operation, the system and infrastructure monitoring and management server 334 retrieves metrics for a service model from a database 322 or other data storage location. The infrastructure monitoring and management server 334 then applies the metrics to obtain metric data by sending messages, such as SNMP messages, to the various devices or processes that are the subject of the retrieved metrics. The metric data is then stored, such as in the database 322. The granularity at which metric data is stored may vary between embodiments. Some embodiments may store all metric measurements while other embodiments may store a calculated value or indicator of one or more of health, quality, risk, availability, or other calculated value or indicator for a service model. In any event, when the metric data is stored, a date identifying when the metric data was generated is also stored.

Administrator tools of the infrastructure monitoring and management server 334 in some embodiments may include tools to modify CI settings of the various IT resources of the networked computing environment 300. Such tools may include client-based or web-based user interfaces, and underlying computer code, providing a view of current CI settings and allowing the administrator to modify the CI settings. Such tools may also include client-based or web-based user interfaces, and underlying computer code, to present a view of patterns available for implementation with regard to a particular service model. Such user interfaces may also allow an administrator to select a pattern for implementation. When a selection of a pattern is received for implementation, the infrastructure monitoring and management server 334 may issue commands to the IT resources of CIs included in the pattern to modify CI configuration settings. In other embodiments, the infrastructure monitoring and management server 334 may issue one or more commands to a provisioning process that operates to implement changes, such as by modifying individual CIs or by selecting a pattern for implementation, in the networked computing environment 300. In these and other embodiments, one or more change requests may also, or alternatively, be generated and submitted to a change request system requesting that the pattern be implemented.

However, when the infrastructure monitoring and management server 334 makes changes to CI settings, previous values of the CI configuration settings may be written to a log or archive of the configuration settings along with a date when the change was made. The archive of configuration settings and the stored metric data, both including dates, may then be used to correlate changes in performance of a service model performance to changes in CI settings of the service model. For example, a process of the infrastructure monitoring and management server 334 may operate to identify performance improvements over various periods. For example, if a change in a health indicator of a service model in the stored metric data changes more than ten percent, assuming the indicator is measured by a percentage, over a 24-hour period, the configuration setting archive may be evaluated to determine if a change was to the CI configuration settings.

In some such embodiments, when a configuration change is identified, the current configuration of the service model is compared to the pervious configuration to identify the modified CI configuration settings. When the health indicator changes upward, indicating the service model is healthier, the identified CI configuration settings are stored as a candidate pattern. When the health indicator changes downward, indicating the service model is less healthy, the identified CI configuration settings are stored as a candidate anti-pattern. Candidate patterns and anti-patterns may then be presented in an interface to an administrator to receive confirmation that identified the CI configuration settings do form a pattern or anti-pattern. The administrator may also be presented with the option to add metadata to the pattern. The metadata may describe what is accomplished or resolved through implementation of the CI configuration settings of the pattern, an association to a particular hardware device type or model, an association to a software program and version, and other metadata, depending on the particular embodiment. In the instance of an anti-pattern, an administrator may add metadata associating the anti-pattern to a pattern which can be implemented to resolve the issues presented by the anti-pattern. The pattern or anti-pattern is then typically stored to the database 322 or other data storage location.

In some embodiments, when the infrastructure monitoring and management server 334 includes stored anti-patterns, a process may execute within the networked computing environment to identify service models having CI configuration settings matching anti-patterns. When an anti-pattern is identified within a current configuration of the networked computing environment 300, a notice may be provided to an administrator. In some embodiments, when an anti-pattern is identified and the identified anti-pattern includes a pattern associated in metadata, the CI configuration settings of the pattern may be automatically implemented, such as through a provisioning application or process.

In some embodiments, upon detection of a performance metric violation by a process of the infrastructure monitoring and management server 334, the process may search the stored patterns, such as in the database 322, to identify a pattern that may be implemented to resolve the performance metric violation. When a pattern is identified, the pattern may be automatically implemented, such as through a provisioning application or process. In other embodiments, a message may be sent to an administrator including an identification of the performance metric violation and data representative of the identified pattern.

As discussed above, patterns and anti-patterns are identified and utilized with regard to CIs of service models. The CIs of a service model may represent elements of IT infrastructure technology such as routers, switches, data storage devices, servers, client computers, logical server programs and processes, and applications and processes that execute on server or client computers. Service models may be associated with metrics. The metrics evaluate parameters of the service model to obtain indicators of quality, availability, risk, and heath levels of an underlying system and identify constituent CIs that are affecting the service model. These metrics and indicators can be defined with Service Level Agreements or Objectives (SLA or SLO) and their associated operational level agreements.

Figure 6:
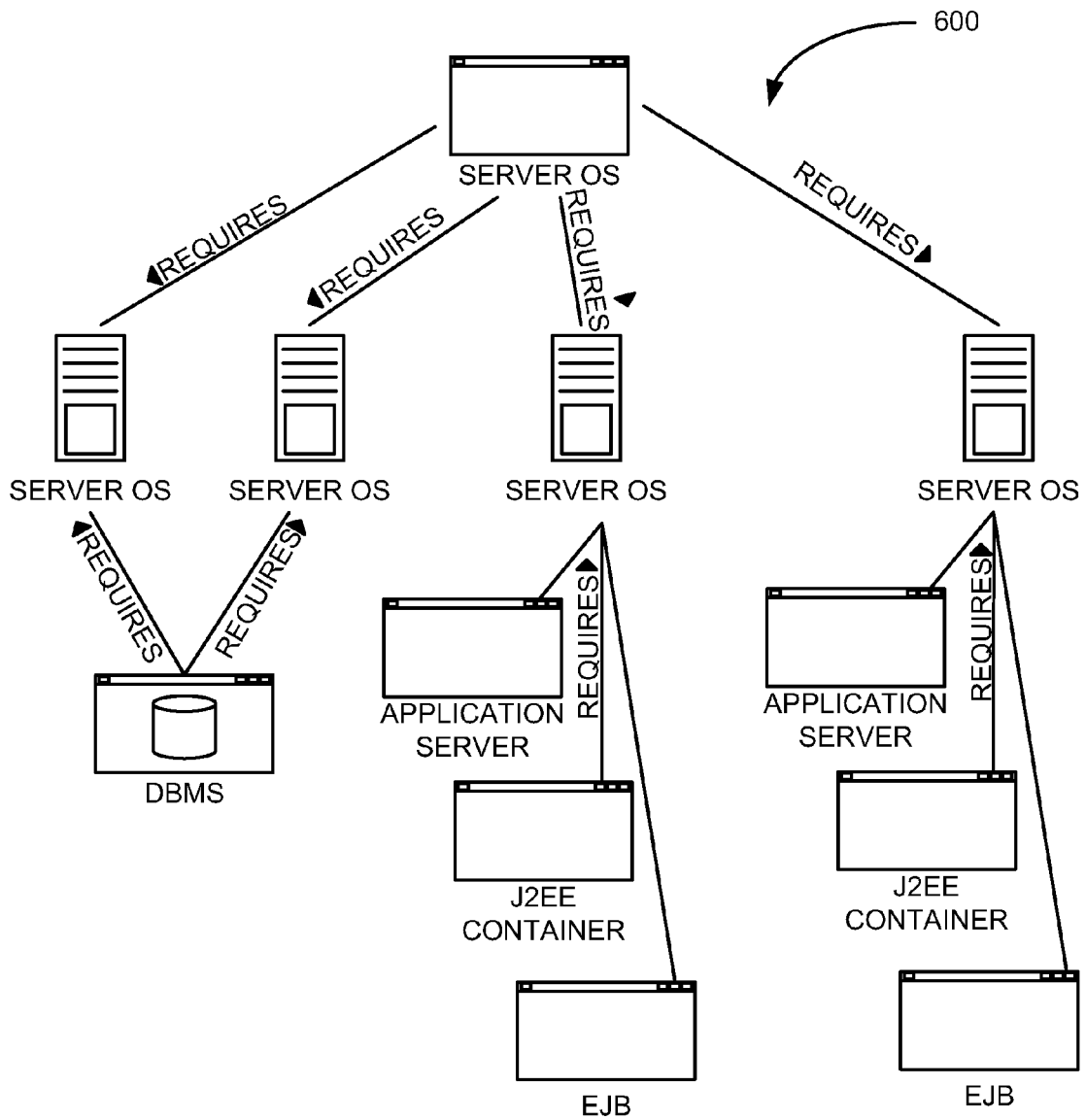
FIG. 6 illustrates a graphical representation of an abstracted service model according to an example embodiment.

A service model is an implementation of an abstract model, such as is illustrated in FIG. 6. The abstract model of FIG. 6 includes a graphical representation of abstracted CIs of the service model. FIG. 5 illustrates an abstraction of an example CI. FIG. 4 illustrates a CI from which the abstraction of FIG. 5 may be generated.

FIG. 4 illustrates a data structure 402 according to an example embodiment. The data structure 402 is an example of a CI. The data structure 402 includes an identifier (DATABASE SERVER DB3-#23), a name, a description, and other data. The other data includes "# of Licenses," a cost-per-license, and maintenance costs. The data of the CI data structure 402 may be modified as discussed above. In some embodiments, upon modification, a snapshot of the data is stored in a database along with a data when the data was changed. The snapshot may be used following the modification should a change in system performance be detected indicating a pattern or anti-pattern may be present in a system configuration. A snapshot of the data structure 402, along with other CIs of a service model, may also be taken upon detection that the CI of the data structure is associated with a service model that maintains or improves performance over time indicating a possible pattern or degrades performance of a service model over time indicating a possible anti-pattern.

When building a service model, to which performance metrics may be associated to measure performance of the service model, abstractions of service model CIs, such as the CI illustrated in FIG. 4, are made. FIG. 5 illustrates a data structure 502 according to an example embodiment. The data structure 502 is an example of an abstraction of the CI data structure 402 of FIG. 4. A service model is comprised of one or more abstracted configuration models and typically includes one or more associated performance metrics to measure and monitor performance thereof when implemented. A graphical representation of an example abstracted service model is illustrated in FIG. 6.

FIG. 6 illustrates a graphical representation of an abstracted service model 600 according to an example embodiment. The abstracted service model 600 includes a CI for each node of the service model and defines relationships there between. For example, a server operating system requires a server and database management systems, application servers, J2EE containers, and Enterprise Java Beans (EJBs) require a server having an operating system. Each node, such as the servers, server operating system, database management system (DBMS), and the like is an abstracted CI, such as is illustrated and described with regard to the CI data structure 502 of FIG. 5, although the configuration settings of each CI will vary between CI types. When implemented, each CI of the abstracted service model is associated with an IT resource of a computing environment, such as the networked computing environment 300 as illustrated and described with regard to FIG. 3. When a snapshot of the CIs is taken upon occurrence of a CI modification event, a detected improvement or degradation of performance with regard to the service model, or at another time, the CI configuration values of the relevant CIs may be taken and stored in a database with a date of the snapshot. In some embodiments, a time of day when snapshot was taken is also included with the date.

When a candidate or actual pattern is detected, the abstracted service model is a template for generating the pattern data structure. The CI configuration settings for the pattern are populated into the pattern data structure, which is an instance of the abstracted service model. The pattern may then be augmented with additional data, such as metadata. The additional data may include a pattern name and classification that is descriptive and unique among patterns that help in identifying and referring to the pattern. The additional data may also include data describing the goal behind the pattern and the reason for using it, alternative names for the pattern, motivations for using the pattern such as use case descriptions, and contextual information describing a context within which the pattern may be useful. In some embodiments, the additional data may also include a graphical representation of the pattern, such as is illustrated in FIG. 6, and a listing of CIs, processes, services, and devices utilized in the pattern and descriptions of their respective roles. Some patterns might also include a description of results, side effects, and tradeoffs caused by using the pattern, a description of how to implement the pattern. The additional data in some of these embodiments may also include an instruction set for a provisioning application to automatically implement the pattern. Other additional data may be included in these and other embodiments.

Following instantiation of a pattern and population of the pattern with CI configuration settings and relevant additional data, the pattern is stored, such as in the database 322 of FIG. 3. Stored patterns and anti-patterns may also be obtained from other sources. Such other sources may include an install disk from which software was installed, a marketplace server from which patterns may be downloaded, or other sources depending on the particular embodiment.

Stored pattern data structures representing patterns and anti-patterns may be utilized for at least two distinct purposes. Patterns define known solutions that are likely to remediate successfully particular defined problems. Anti-patterns are defined problems that may exist in systems. Anti-patterns can therefore be used to evaluate a configuration of a system within which a service model of an anti-pattern is present. If the service model of an anti-pattern is present in a system, the anti-pattern is utilized to determine if there is a match, either exact or relative to some degree. If there is a match, a potential problem is identified. A problem may also be identified through application of performance metrics. In either case of problem identification, details of the identified problem may be used to automatically or manually query the stored patterns to identify potential solutions. The solutions may be identified through the additional data of the stored patterns as described above. An identified pattern may then be selected and implemented to resolve the identified problem. However, in some embodiments, metadata of an anti-pattern may include a reference to one or more patterns that will remediate the anti-pattern.

Figure 7:
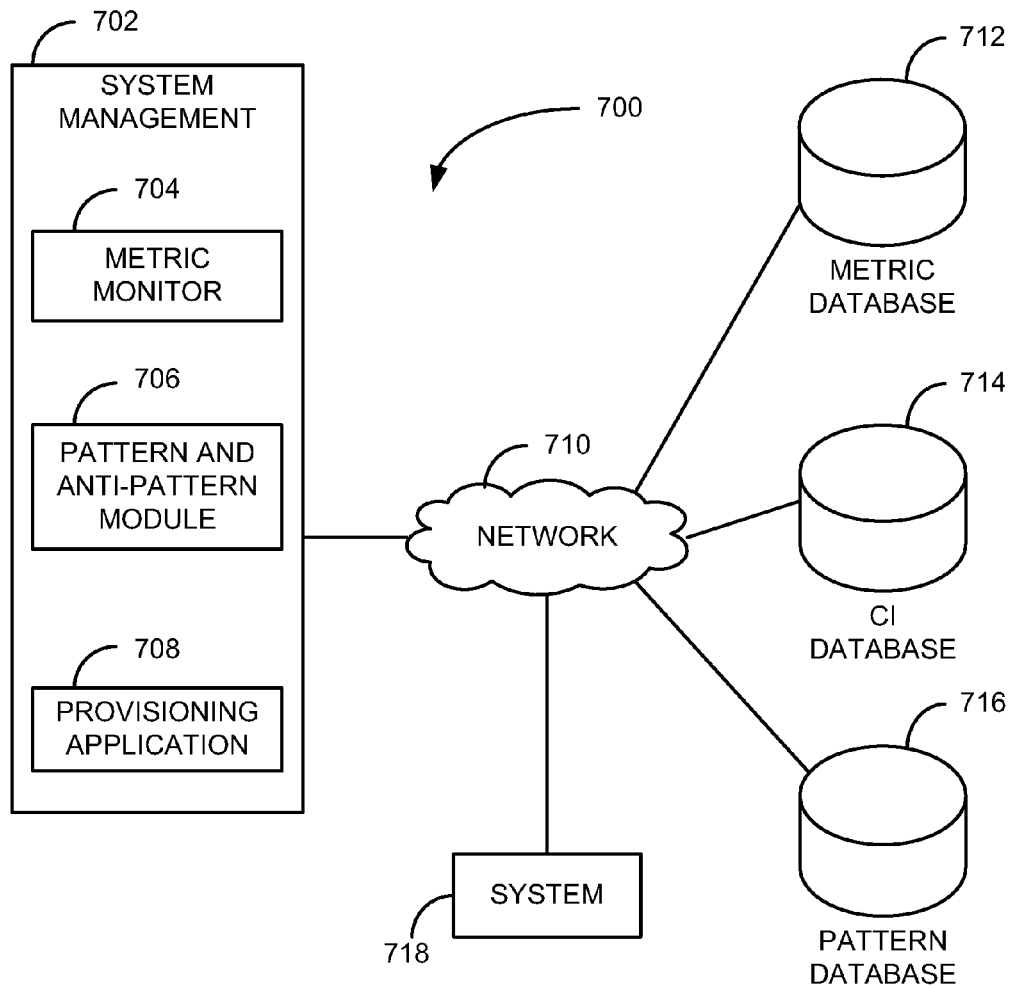
FIG. 7 is a logical block diagram of a system according to an example embodiment.

FIG. 7 is a logical block diagram of a system 700 according to an example embodiment. The system 700 is an example of a system within which pattern identification and usage is performed. The example system 700 includes a system under management 718, such as the networked computing environment 300 of FIG. 3 of a software system deployed therein.

The system 700 includes a system management application 702. The system management application 702 may include various modules to perform various tasks. For example, the system management application 702 may include a metric monitoring module 704, a pattern and anti-pattern module 706, and a provisioning application module 708. Although these modules 704, 706, 708 are illustrated and described with regard to a single system management application 702, the functionality of these modules 704, 706, 708 may be provided by individual applications, by more than one application, within the same module, or other arrangement.

The system management application 702 is connected to a network 710, such as one or more of a local area network, the Internet, or other network. Also connected to the network are the system under management 718, a metric database 712, a configuration item database 714, and a pattern database 716. Although the system under management 718 is illustrated as a single box, the system under management may be the networked computing environment 300 of FIG. 3, an instance of the service model 600 illustrated in FIG. 6, an enterprise application, or other application, computing environment, or set of computing resources.

The metric monitor module 704 executes to retrieve performance metrics from the metric database 712 over the network 710. The metric monitoring module 704 then applies the metrics to the system under management 718 to measure performance and identify metric violations. Results from applying the metrics may be stored by the metric monitor module 704 to the metric database 712 with a time value indicating a date and time when the metric was applied to obtain each respective metric result value.

The metric monitoring module 704 may include a process that monitors metric results stored in the metric database 712 to identify trends of improving and decreasing performance. The metric monitoring module 704 also includes a process that identifies when performance metric violations, such as service level agreement violations, occur. Upon detection of decreasing performance or a metric violation, the process may query patterns stored in the pattern database 716 to identify patterns that may be relevant for resolving the metric violation or improving the decreasing performance of the system under management 718. Upon identification of a pattern to resolve the identified issue, the process of the metric monitoring module 704, in some embodiments, may submit a request to a service desk application requesting manual implementation of the identified pattern by an administrator. In other embodiments, upon identification of a pattern to resolve the identified issue, the process may submit a command to the provisioning application 708 requesting automated implementation of the identified pattern. The provisioning application 708 in such instances will then deploy the CI settings of the pattern to the system under management 718.

In some embodiments, following implementation of a pattern to resolve an issue identified by the process of the metric monitoring module 704 that monitors metric results stored in the metric database 712 to identify trends of improving and decreasing performance, one or more metrics may be again applied by the metric monitoring module 704. In this instance, the metrics are applied again to verify that the identified issue has been resolved by the implemented pattern. In some instances, the identified issue may have only been incrementally resolved and another pattern may be identified and implemented to make a further incremental improvement. The metric monitoring module 704 may continue in this iterative manner (i.e., applying metrics, identifying and implementing a pattern, applying metrics, identifying and implementing a pattern, etc.) until the metric violations have been resolved. In some embodiments, the iterative nature of the process of the metric monitor module 704 may performed over an extended period to allow the metrics to have a sufficient period to consider system or process performance changes resulting from an implemented configuration change.

The metric monitor module 704, upon identification of a trend of improving and decreasing performance or a performance metric violation, may also send a communication to the pattern and anti-pattern module 706 to evaluate the identified trend or performance metric violation to determine if a new pattern has been identified. In some embodiments, the current configuration of the CIs of the relevant service module may be evaluated in view of known patterns and anti-patterns stored in the pattern database 716. If a known pattern or anti-pattern is not identified, a process of the pattern and anti-pattern module 706 may evaluate metric values stored in the metric database 712 in view of CI configurations settings store in the CI database 714 to define a potential pattern.

Upon detection and definition of a pattern or anti-pattern, the pattern and anti-pattern module 706 may send a copy of the pattern or anti-pattern over the network to a pattern sharing service (not illustrated). The pattern sharing service may be a service hosted by an industry consortium, a software development company, or other entity for sharing knowledge through identified patterns and anti-patterns. When a pattern or anti-pattern is sent to the pattern sharing service, a process may execute upon the received pattern to identify similarities with other patterns previously received by the service. Duplicate patterns are discarded. The pattern sharing service then makes the remaining patterns and anti-patterns available. In some instances, the patterns and anti-patterns may be pushed to or periodically downloaded to the pattern database 716 of constituents of the pattern sharing service.

Figure 8:
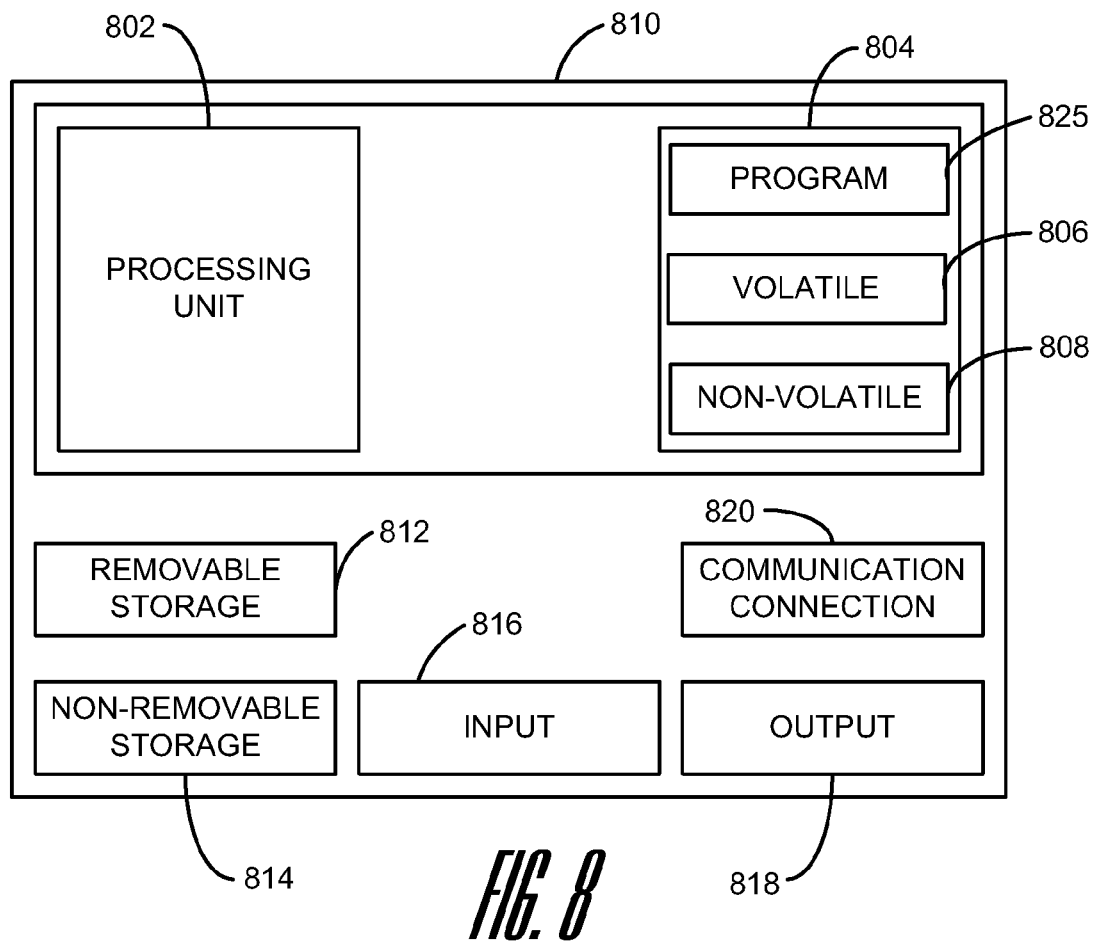
FIG. 8 is a block diagram of a computing device according to an example embodiment.

FIG. 8 is a block diagram of a computing device according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 810, may include a processing unit 802, memory 804, removable storage 812, and non-removable storage 814. Memory 804 may include volatile memory 806 and non-volatile memory 808. Computer 810 may include—or have access to a computing environment that includes—a variety of computer-readable media, such as volatile memory 806 and non-volatile memory 808, removable storage 812 and non-removable storage 814. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 810 may include or have access to a computing environment that includes input 816, output 818, and a communication connection 820. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable storage medium are executable by the processing unit 802 of the computer 810. A hard drive, CD-ROM, and RAM are some examples of articles including a computer-readable storage medium. For example, a computer program 825 capable performing one or more of the method described herein. Further, the computer program 825 may be the system management application 702 program illustrated and described with regard to FIG. 7.

Figure 9:
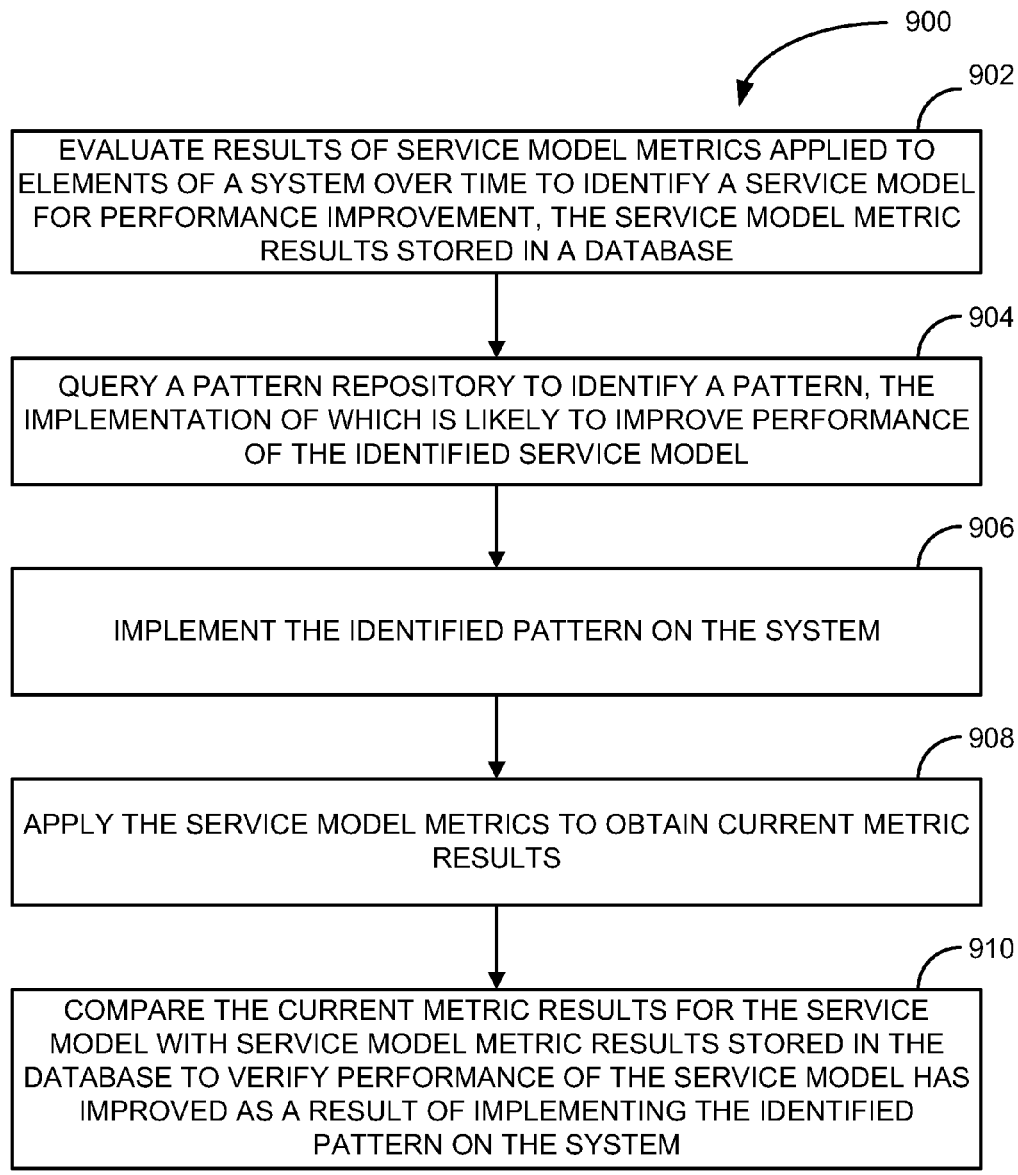
FIG. 9 is a flow diagram of a method according to an example embodiment.

FIG. 9 is a flow diagram of a method 900 according to an example embodiment. The method 900 is an example of a method that may be implemented for agile re-engineering of information systems. Some such embodiments perform the method 900 to achieve incremental system performance improvement and perform the method 900 in an iterative manner until a desire outcome is achieved. The method 900 may be performed automatically on a recurring or scheduled basis.

The method 900 includes evaluating 902 results of service model metrics applied to elements of a system over time to identify a service model for performance improvement. The service model metric may be stored in and retrieved from a database, such as the database 322 illustrated and described with regard to FIG. 3. The evaluating 902 may include evaluating the service model metrics for violations of fault conditions defined within the service model. In some embodiments, the service model metrics may individually or collectively measure performance of hardware devices, software processes, hardware systems, software systems, and groups thereof.

The method 900 also includes querying 904 a pattern repository to identify a pattern, the implementation of which is likely to improve performance of the identified service model and implementing 906 the identified pattern on the system. The pattern repository may be located in the database 322 or on another data storage device local to or remove from a computer performing the method 900.

Following implementation 906 of the identified pattern, the method 900 further includes applying 908 the service model metrics to obtain current metric results. The current metric results are then compared 910 with service model metric results stored in the database to verify performance of the service model has improved through implementation of the identified pattern on the system. In some embodiments, upon verification that performance of the service model has improved, the method 900 may be repeated to identify another service model for performance improvement. However, when the comparing 910 of the current metric results does not verify that performance of the service model has improved, the method 900 may include rolling back the implemented pattern on the system to a previous configuration.

According to some embodiments of the method 900, applying 908 the service model metrics to obtain current metric results includes applying the service model metrics periodically over a period. The period may be a day, a week, a month, or other period. The period may be designated or selected based on a property of a service model that is being improved by the method 900. For example, when the service model is of a process that executes only twice per month, such as a payroll process, an immediate application 908 of the service model metrics following implementation 906 of the identified pattern is unlikely to provide a useful metric result. Thus, a service model may also include metadata identifying a period over which service model metrics are to be applied 908.

Implementing 906 the identified pattern may be performed automatically in some embodiments. Automatic implementation 906 of the identified pattern may include issuing a command to a provisioning application of a computing environment. The provisioning application in such embodiments is typically operable to modify a configuration of the system upon receipt of such a command. In such embodiments, the command may identify an action, such as deploy a pattern. The command in such an instance will also include an argument identifying the pattern to implement.

Some embodiments of the method 900 may further include comparing configuration item values of the system with an anti-pattern to detect a presence of the anti-pattern within the system. Upon detection of the anti-pattern, such embodiments include querying the pattern repository to identify a pattern, the implementation of which resolves the detected anti-pattern. The implementing 906 of the method 900 in these embodiments may include implementing the pattern identified to resolve the detected anti-pattern.

Figure 10:
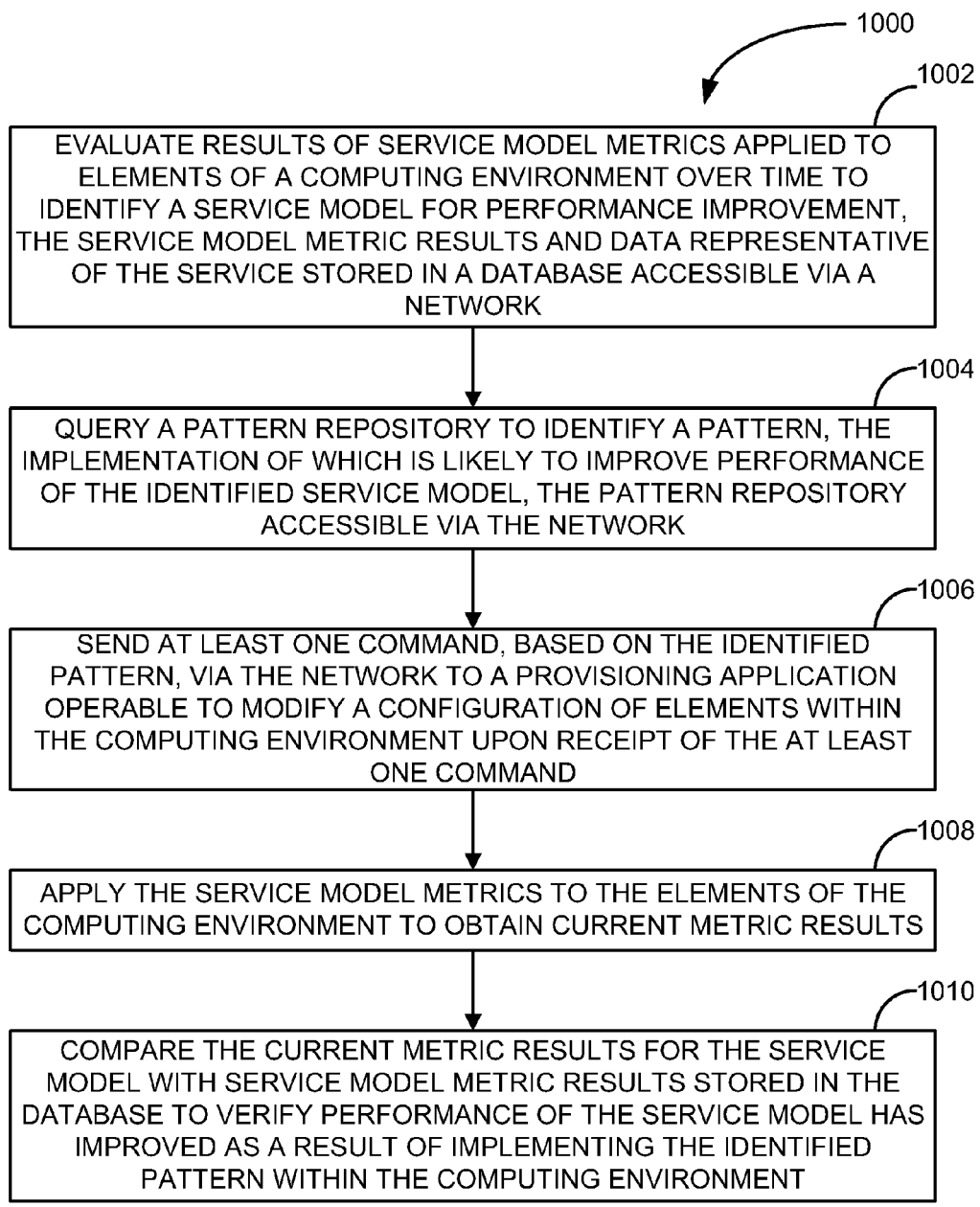
FIG. 10 is a flow diagram of a method according to an example embodiment.

FIG. 10 is a flow diagram of a method 1000 according to an example embodiment. The method 1000 is another example of a method that may be implemented for agile re-engineering of information systems. In some embodiments, the method 1000 may be implemented on a system including at least one processor, at least one memory device, and a network interface device, such as a network interface card or integrated circuit. The method 1000 may be implemented in such embodiments through an instruction set stored on the at least one memory device. The instruction set includes instructions executable by the at least one processor.

The method 1000 includes evaluating 1002 results of service model metrics applied to elements of a computing environment to identify a service model for performance improvement. The service model metric results and data representative of the service are typically stored in a database accessible via a network. The method 1000 further includes querying 1004 a pattern repository to identify a pattern, the implementation of which is likely to improve performance of the identified service model. The pattern repository may also be accessible via the network. The method 1000 then sends 1006 at least one command via the network to a provisioning application to implement the identified pattern. Following implementation of the identified pattern, the service model metrics are reapplied 1008 to the elements of the computing environment to obtain current metric results. The method 1000 may then compare 1010 the current metric results with stored service model metric results to verify performance of the service model has improved.

Figure 11:
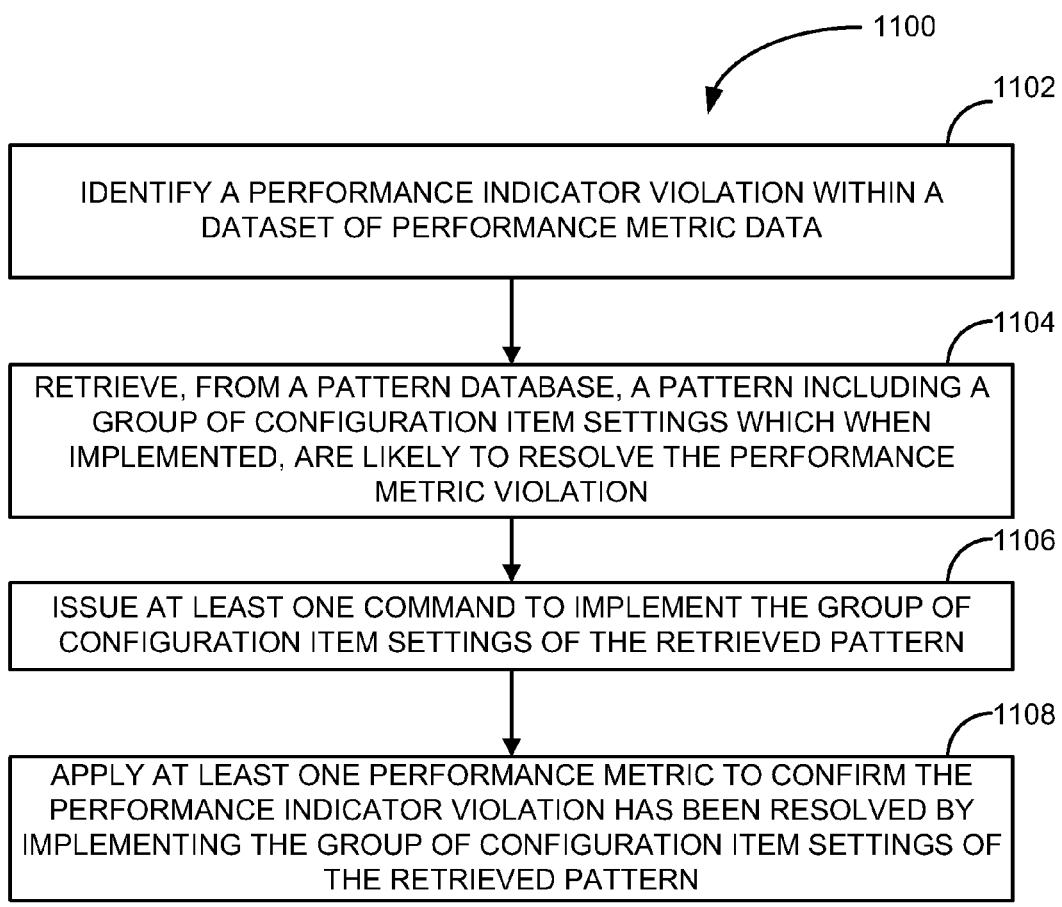
FIG. 11 is a flow diagram of a method according to an example embodiment.

FIG. 11 is a flow diagram of a method 1100 according to an example embodiment. The method 1100 is an example method of identifying a performance indicator violation, identifying and implementing a solution, and verifying resolution of the performance indicator violation. The performance indicator may be data representative of a KPI violation.

The method 1100 includes identifying 1102 a performance indicator violation within a dataset of performance metric data and retrieving 1104, from a pattern database, a pattern including a group of configuration item settings which when implemented, are likely to resolve the performance metric violation. The method 1100 further includes issuing 1106 at least one command to implement the group of configuration item settings of the retrieved pattern and applying 1108 at least one performance metric to confirm the performance indicator violation has been resolved.

The performance indicator violation may indicate an inadequate capacity violation with regard to a storage device or system, inadequate processing capacity within a server, a bandwidth shortage within a network, or other inadequacy. The issuing 1106 of commands to implement the group of configuration item settings of the retrieved pattern may include generating a system change request to add capacity with regard to at least one hardware device. Alternatively, the issuing 1106 of commands may be an issuing of commands to modify a configuration of a load balancing device, process, or application to route requests to an alternate resource.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A computerized method comprising:
    evaluating, by processing data with at least one computer processor, results of service model metrics applied to elements of a system over time to identify a service model for performance improvement, the service model metric results stored in a database;
    querying a pattern repository to identify a pattern, the implementation of which is likely to improve performance of the identified service model, each pattern in the pattern repository including associated data representative of configuration item configuration settings that can be instantiated to implement the pattern, each pattern stored in the pattern repository defining a known solution to at least one defined issue identifiable through application of at least one service model metric;
    implementing the identified pattern on the system;
    applying the service model metrics to obtain current metric results;
    comparing the current metric results for the service model with service model metric results stored in the database to verify performance of the service model has improved as a result of implementing the identified pattern on the system;
    in response to the comparing of the current metric results for the service model with service model metric results stored in the database verifying that performance of the service model has not improved, rolling back the implemented pattern on the system to a previous configuration;
    comparing configuration item values of the system with an anti-pattern to detect a presence of the anti-pattern within the system;
    in response to detection of the anti-pattern, querying the pattern repository to identify a resolution pattern, the resolution pattern configured to resolve the detected anti-pattern; and
    implementing the resolution pattern.

2. The computerized method of claim 1, wherein upon verification that performance of the service model has improved, repeating the method to identify another service model for performance improvement.

3. The computerized method of claim 1, wherein applying the service model metrics to obtain current metric results includes applying the service model metrics periodically over a period.

4. The computerized method of claim 1, wherein the implementing of the identified pattern is performed automatically by issuing a command to a provisioning application of a computing environment, the provisioning application operable to modify a configuration of the system upon receipt of commands.

5. The computerized method of claim 1, wherein the computerized method is performed automatically on a recurring basis.

6. The computerized method of claim 1, wherein the evaluating results of service model metrics includes:
    evaluating the service model metrics for violations of fault conditions defined within the service model.

7. A system comprising:
    at least one processor;
    at least one memory device;
    a network interface device;
    an instruction set held in the at least one memory device and executable by the at least one processor to cause the system to:
        evaluate results of service model metrics applied to elements of a computing environment over time to identify a service model for performance improvement, the service model metric results and data representative of the service stored in a database accessible via the network interface device;
        query a pattern repository to identify a pattern, the implementation of which is likely to improve performance of the identified service model, the pattern repository accessible via the network interface device, each pattern in the pattern repository including associated data representative of configuration item configuration settings that can be instantiated to implement the pattern, each pattern stored in the pattern repository defining a known solution to at least one defined issue identifiable through application of at least one service model metric;
        send at least one command, based on the identified pattern, via the network interface device to a provisioning application operable to modify a configuration of elements within the computing environment upon receipt of the at least one command;
        apply the service model metrics to the elements of the computing environment to obtain current metric results;
        compare the current metric results for the service model with service model metric results stored in the database to verify performance of the service model has improved as a result of implementing the identified pattern within the computing environment;
        in response to the comparing of the current metric results for the service model with service model metric results stored in the database verifying that performance of the service model has not improved, roll back the implemented pattern on the system to a previous configuration;
        compare configuration item values of the computing environment with an anti-pattern to detect a presence of the anti-pattern within the computing environment;
        in response to detection of the anti-pattern, querying, via the network interface device, the pattern repository to identify a resolution pattern, the resolution pattern configured to resolve the detected anti-pattern; and
        send at least one command to implement the resolution pattern.

8. The system of claim 7, wherein upon verification that performance of the service model has improved, repeating execution of the instruction to identify another service model for performance improvement.

9. The system of claim 7, wherein applying the service model metrics to the elements of the computing environment to obtain current metric results includes applying the service model metrics periodically over a period.

10. The system of claim 7, wherein the service model metrics include metrics to measure performance of hardware devices and software processes deployed within the computing environment.

11. The system of claim 7, wherein the evaluating results of service model metrics includes:

evaluating the service model metrics for violations of fault conditions defined within the service model.

12. A computer-readable storage medium, with instructions stored thereon, which when executed by at least one processor of a computer, cause the computer to:

evaluate, by processing data with at least one computer processor, results of service model metrics applied to elements of a system over time to identify a service model for performance improvement, the service model metric results stored in a database;

query a pattern repository to identify a pattern, the implementation of which is likely to improve performance of the identified service model, each pattern in the pattern repository including associated data representative of configuration item configuration settings that can be instantiated to implement the pattern, each pattern stored in the pattern repository defining a known solution to at least one defined issue identifiable through application of at least one service model metric;

implement the identified pattern on the system;

applying the service model metrics to obtain current metric results;

compare the current metric results for the service model with service model metric results stored in the database to verify performance of the service model has improved as a result of implementing the identified pattern on the system;

in response to the comparing of the current metric results for the service model with service model metric results stored in the database verifying that performance of the service model has not improved, roll back the implemented pattern on the system to a previous configuration;

comparing configuration item values of the system with an anti-pattern to detect a presence of the anti-pattern within the system;

in response to detection of the anti-pattern, querying the pattern repository to identify a resolution pattern, the resolution pattern configured to resolve the detected anti-pattern; and implementing the resolution pattern.

13. The computer-readable storage medium of claim 12, wherein upon verification that performance of the service model has improved, repeating the method to identify another service model for performance improvement.

14. The computer-readable storage medium of claim 12, wherein applying the service model metrics to obtain current metric results includes applying the service model metrics periodically over a period.

15. The computer-readable storage medium of claim 12, wherein the implementing of the identified pattern is performed automatically by issuing a command to a provisioning application of a computing environment, the provisioning application operable to modify a configuration of the system upon receipt of commands.

16. The computer-readable storage medium of claim 12, wherein the computerized method is performed automatically on a recurring basis.

* * * * *